US011746457B2

(12) United States Patent
Park

(10) Patent No.: US 11,746,457 B2
(45) Date of Patent: Sep. 5, 2023

(54) INTELLIGENT WASHING MACHINE AND CONTROL METHOD THEREOF

(71) Applicant: LG ELECTRONICS INC., Seoul (KR)

(72) Inventor: Yunsik Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 866 days.

(21) Appl. No.: 16/489,988

(22) PCT Filed: Jun. 12, 2019

(86) PCT No.: PCT/KR2019/007102

§ 371 (c)(1),
(2) Date: Aug. 29, 2019

(87) PCT Pub. No.: WO2020/251079

PCT Pub. Date: Dec. 17, 2020

(65) Prior Publication Data

US 2020/0392660 A1 Dec. 17, 2020

(51) Int. Cl.
*D06F 33/48* (2020.01)
*D06F 33/40* (2020.01)
(Continued)

(52) U.S. Cl.
CPC .............. *D06F 33/48* (2020.02); *D06F 23/04* (2013.01); *D06F 33/40* (2020.02); *D06F 34/16* (2020.02);
(Continued)

(58) Field of Classification Search
CPC .......... D06F 33/40; D06F 33/47; D06F 33/48; D06F 33/60; D06F 33/74; D06F 33/76;
(Continued)

(56) References Cited

U.S. PATENT DOCUMENTS 4,007,409 A * 2/1977 Thibaut .................. H02P 7/293 318/459
2018/0042028 A1* 2/2018 Nam .................... H04B 7/0486
(Continued)

FOREIGN PATENT DOCUMENTS

JP 10-174798 A 6/1998
KR 10-2016-0061696 A 6/2016
(Continued)

*Primary Examiner* — David G Cormier
(74) *Attorney, Agent, or Firm* — Birch, Stewart, Kolasch & Birch, LLP

(57) ABSTRACT

Disclosed herein is an intelligent washing machine includes: an inner tub in which laundry is placed; a motor transferring a rotational force to the inner tub; an image obtaining unit obtaining an image of the laundry placed in the inner tub after a washing process; and a controller obtaining a laundry classification information reflecting water content percentage information of the laundry from the image of the laundry, learning the laundry classification information to predict a degree of vibration of the inner tub that occurs in a spin-drying process, and varying a revolutions per minute (RPM) of the motor in the spin-drying process according to the predicted degree of vibration of the inner tub. The washing machine may be associated with an artificial intelligence (AI) module, an unmanned aerial vehicle (UAV) (or drone), a robot, an augmented reality (AR) device, a virtual reality (VR) device, and a device related to a 5G service.

12 Claims, 12 Drawing Sheets

(51) Int. Cl.

| | |
|---|---|
| ***G06T 7/00*** | (2017.01) |
| ***D06F 34/28*** | (2020.01) |
| ***D06F 34/16*** | (2020.01) |
| ***D06F 34/18*** | (2020.01) |
| ***D06F 23/04*** | (2006.01) |
| ***G06T 1/00*** | (2006.01) |
| ***H04W 72/23*** | (2023.01) |
| ***G06V 10/764*** | (2022.01) |
| ***G06V 10/82*** | (2022.01) |
| ***G06V 20/52*** | (2022.01) |
| *D06F 105/58* | (2020.01) |
| *D06F 103/08* | (2020.01) |
| *D06F 105/48* | (2020.01) |

(52) U.S. Cl.

CPC .............. *D06F 34/18* (2020.02); *D06F 34/28* (2020.02); *G06T 1/0014* (2013.01); *G06T 7/0004* (2013.01); *G06V 10/764* (2022.01); *G06V 10/82* (2022.01); *G06V 20/52* (2022.01); *H04W 72/23* (2023.01); *D06F 2103/08* (2020.02); *D06F 2105/48* (2020.02); *D06F 2105/58* (2020.02); *G06T 2207/20081* (2013.01); *G06T 2207/20084* (2013.01); *G06T 2207/30164* (2013.01)

(58) Field of Classification Search

CPC .......... D06F 34/16; D06F 34/18; D06F 35/00; D06F 35/005; D06F 35/006; D06F 35/007; D06F 2103/02; D06F 2103/04; D06F 2103/06; D06F 2103/08; D06F 2103/26; D06F 2103/44; D06F 2103/46; D06F 2103/48; D06F 2105/46; D06F 2105/48; D06F 2105/62

See application file for complete search history.

(56) References Cited

U.S. PATENT DOCUMENTS

| | | | | |
|---|---|---|---|---|
| 2018/0080164 | A1* | 3/2018 | Hoppe | D06F 35/006 |
| 2018/0340283 | A1* | 11/2018 | Quinn | D06F 34/16 |
| 2019/0081675 | A1* | 3/2019 | Jung | H04B 7/088 |
| 2019/0153653 | A1* | 5/2019 | Clayton | G06F 3/0482 |

FOREIGN PATENT DOCUMENTS

| | | | |
|---|---|---|---|
| KR | 10-2017-0138559 | A | 12/2017 |
| KR | 10-2019-0031539 | A | 2/2019 |
| KR | 10-2019-0026517 | A | 3/2019 |

* cited by examiner

【Figure 1】
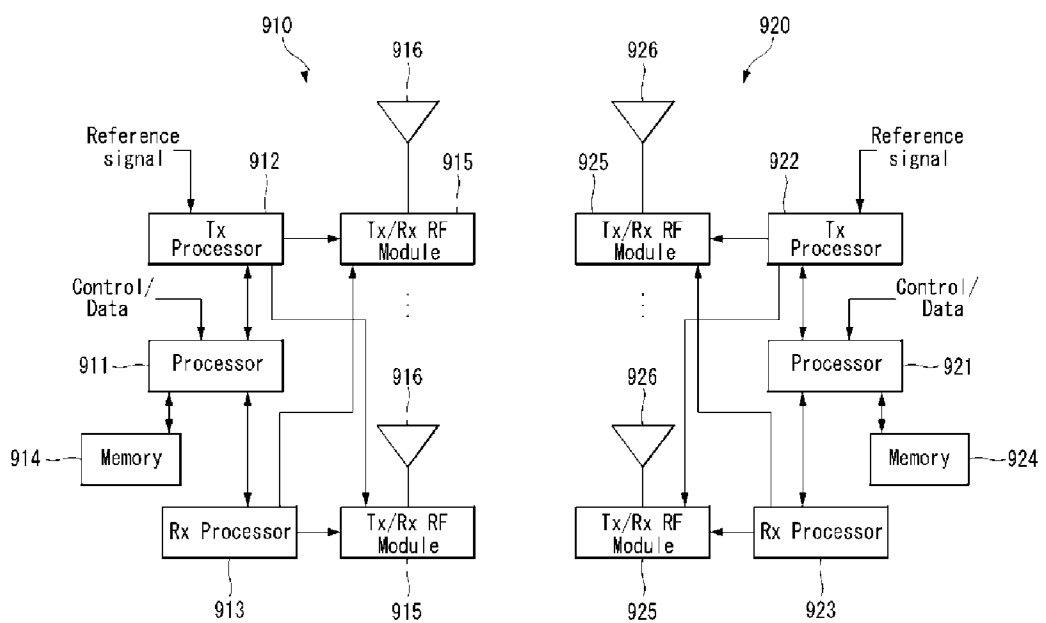

【Figure 2】
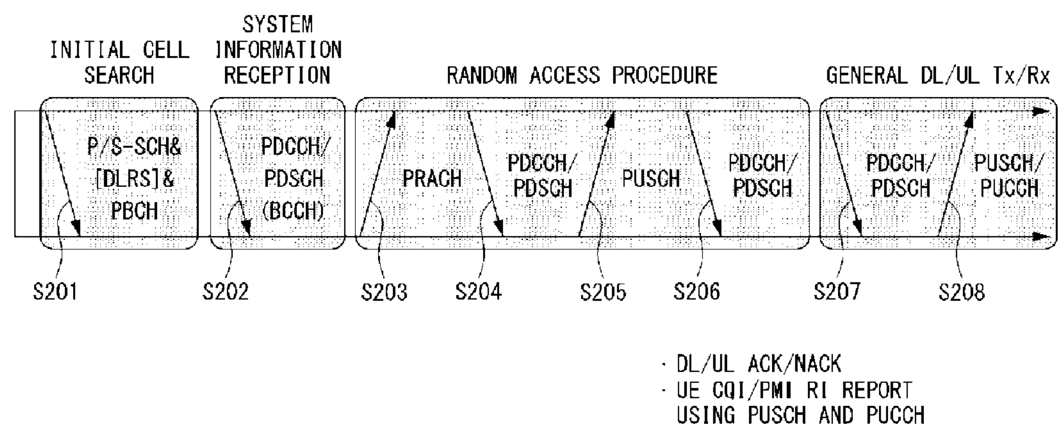

【Figure 3】
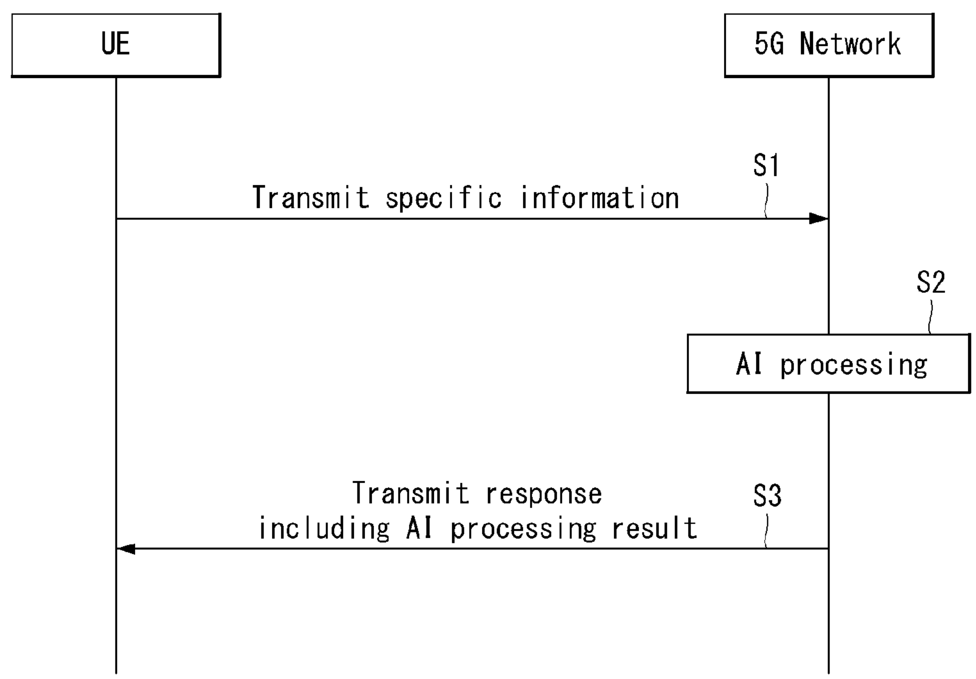

【Figure 4】
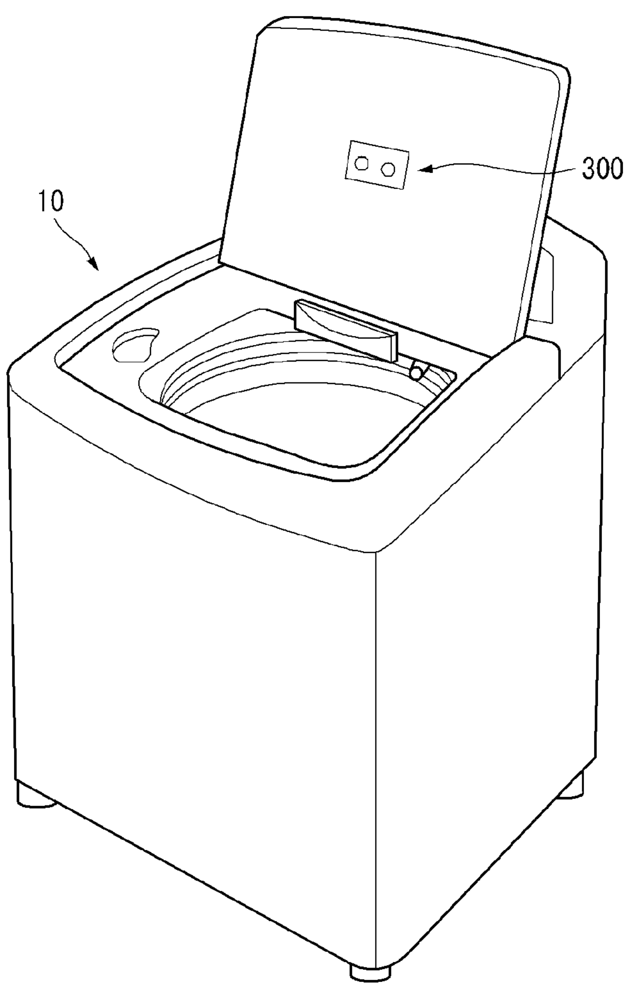

【Figure 5】
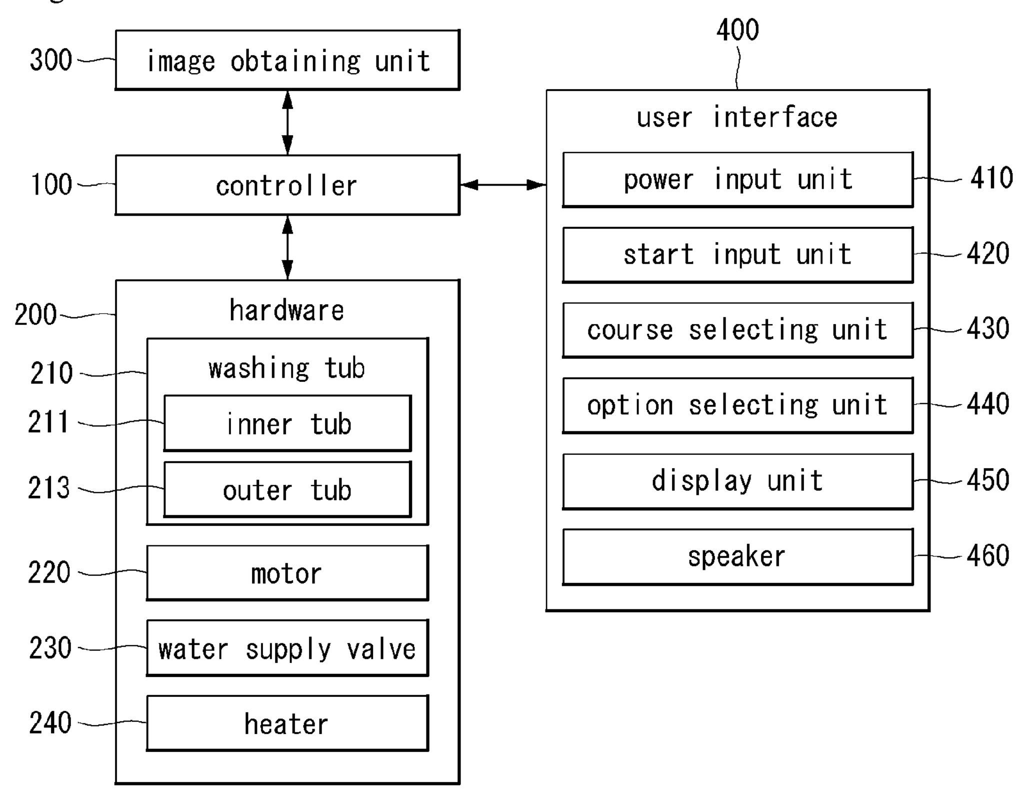

【Figure 6】
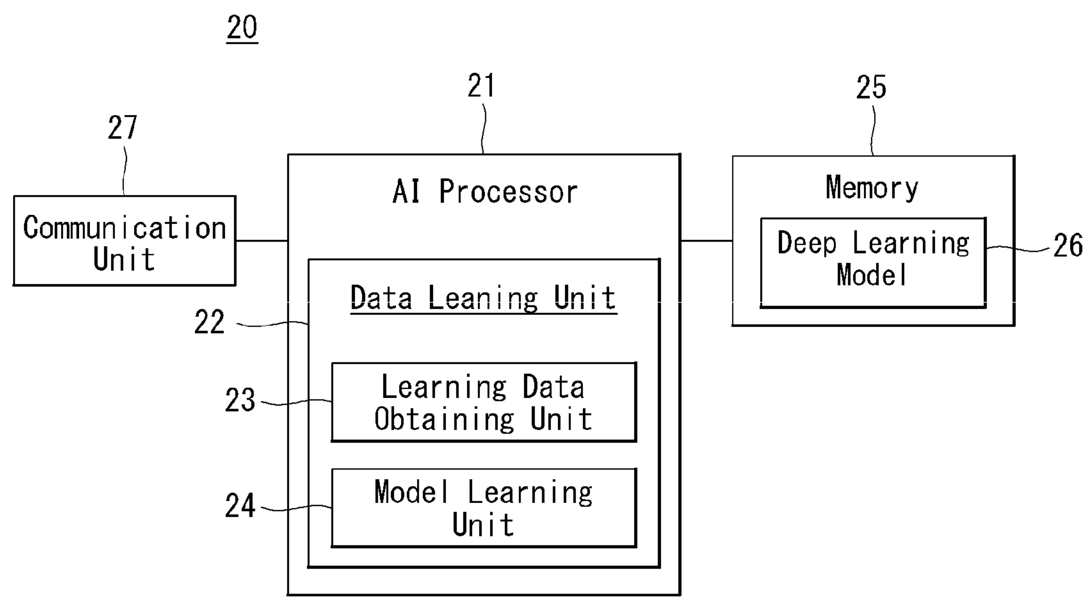

【Figure 7】
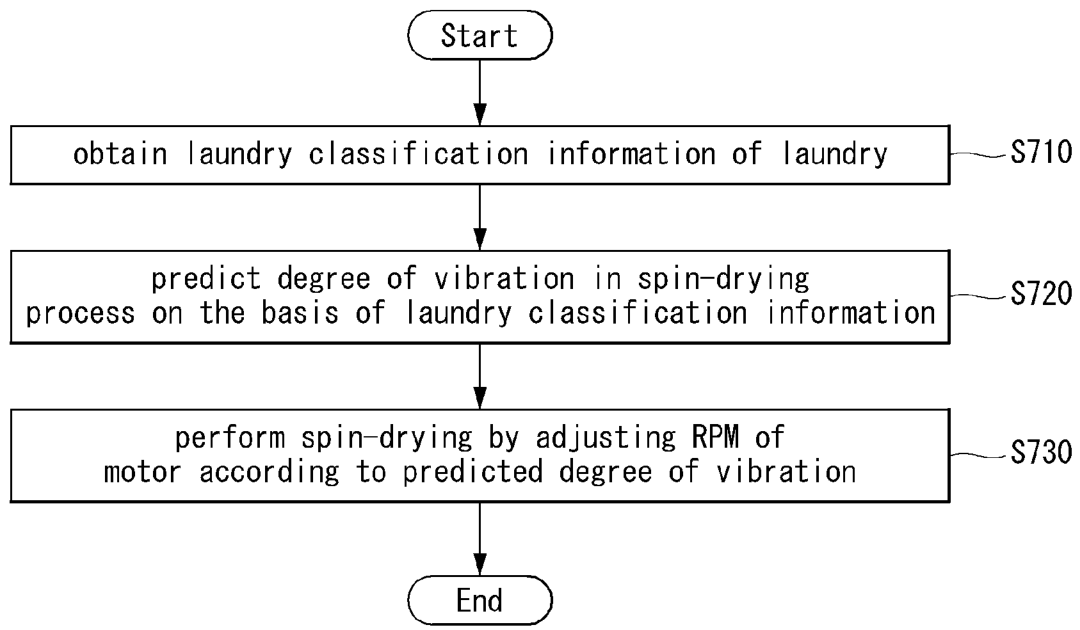

【Figure 8】
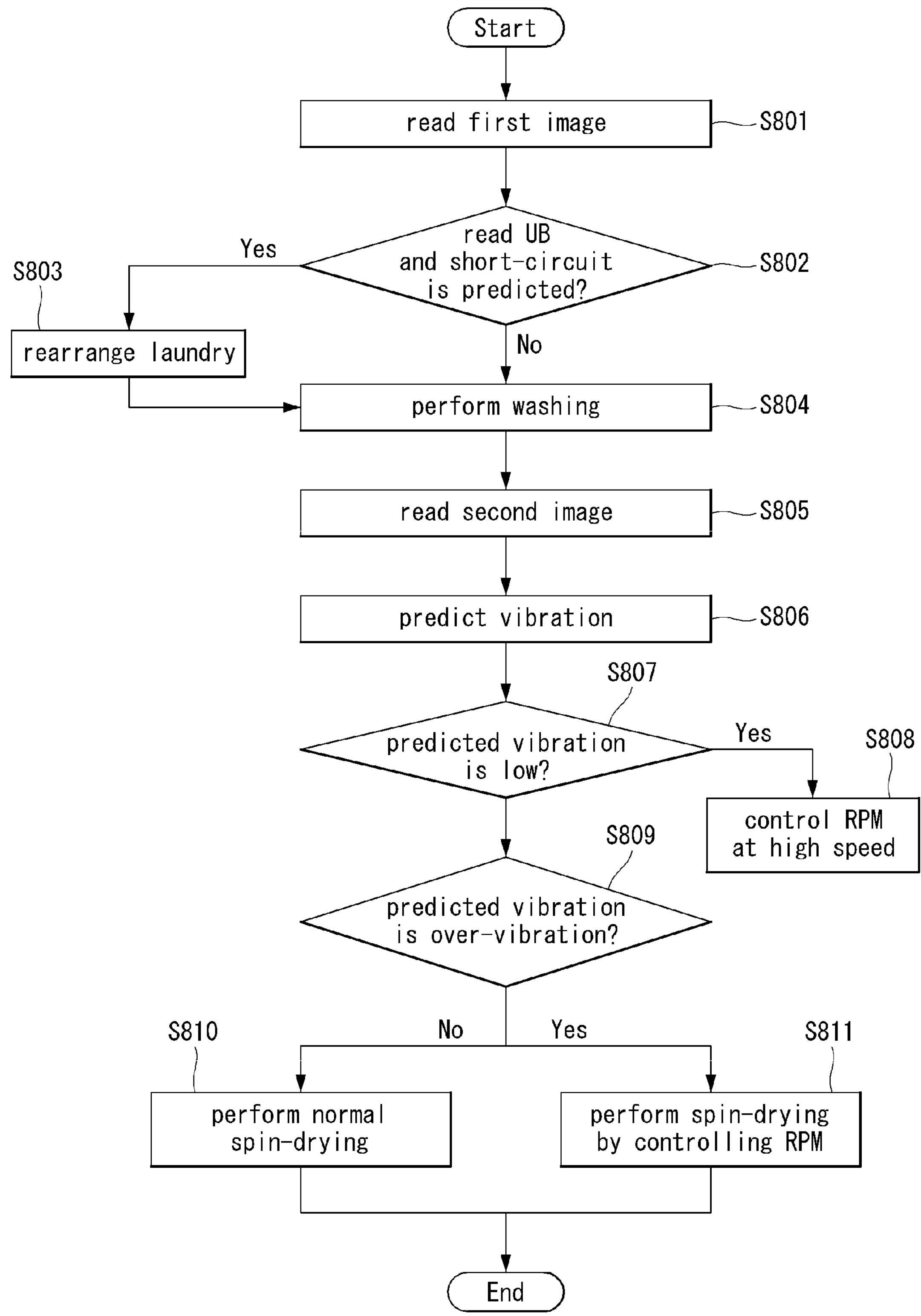

【Figure 9】
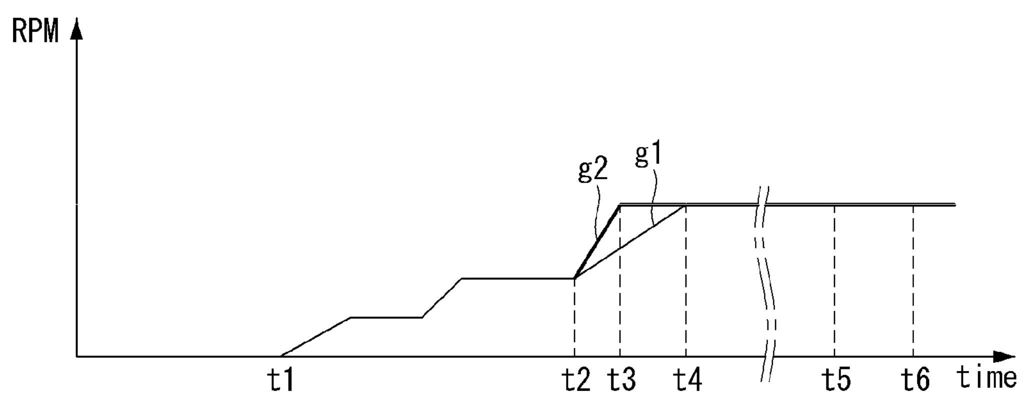

【Figure 10】
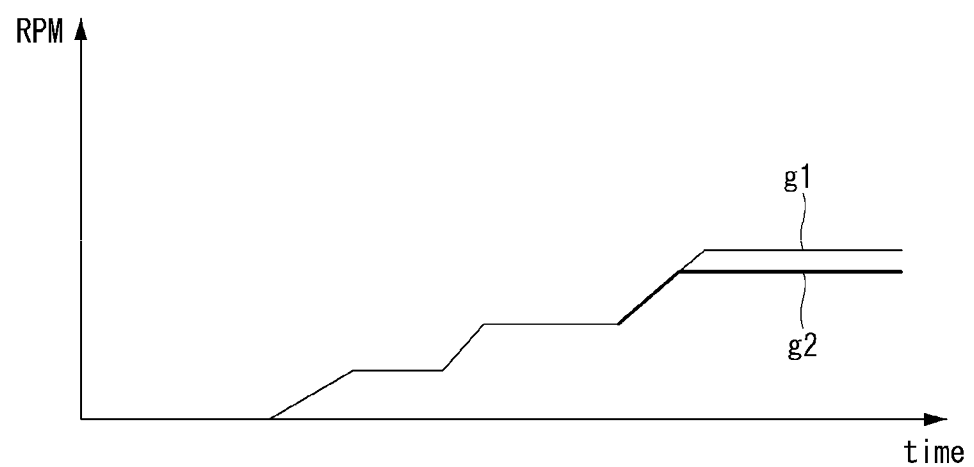

【Figure 11】
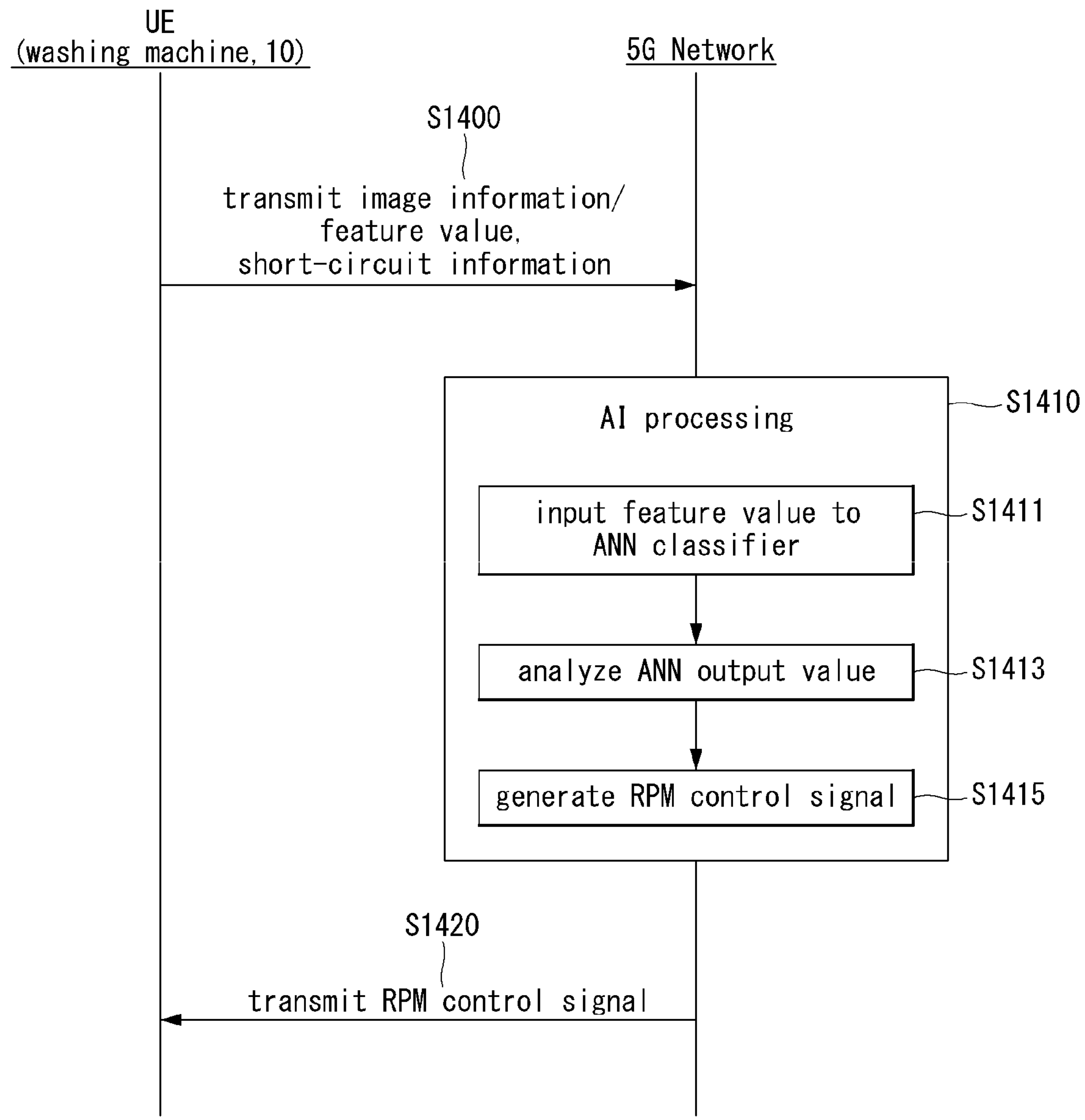

【Figure 12】
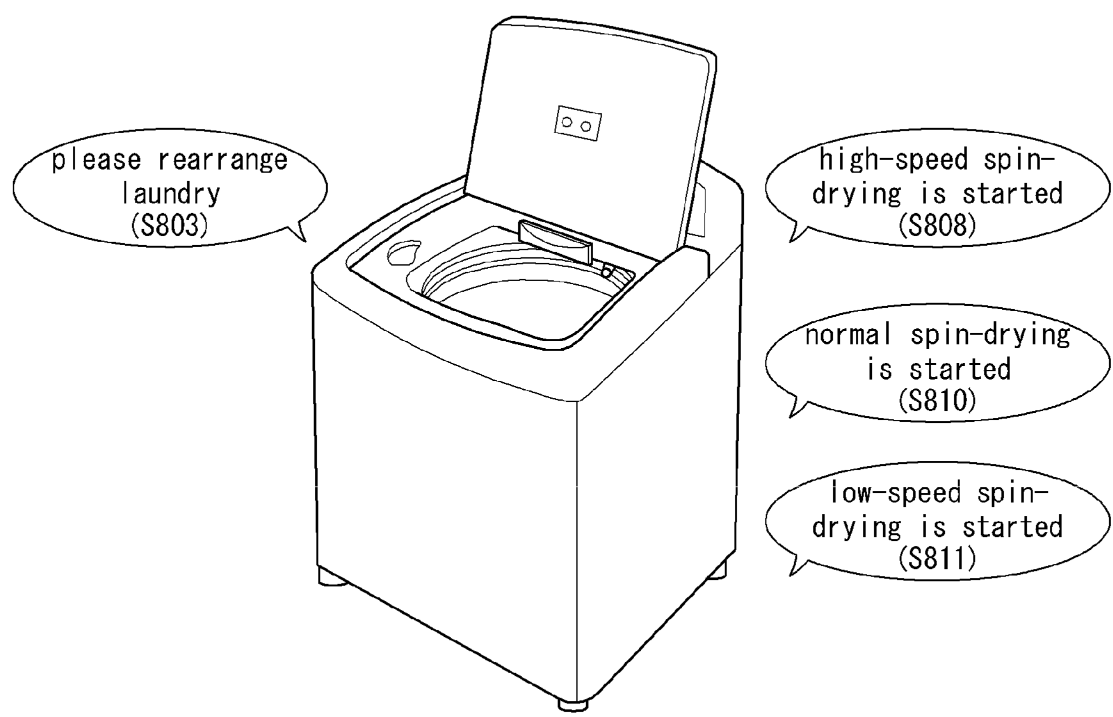

INTELLIGENT WASHING MACHINE AND CONTROL METHOD THEREOF

CROSS REFERENCE TO RELATED APPLICATIONS

This application is the National Phase of PCT/KR2019/007102 filed on Jun. 12, 2019, which is hereby expressly incorporated by reference into the present application.

TECHNICAL FIELD

The present invention relates to an intelligent washing machine and a control method thereof, and more particularly, to an intelligent washing machine and a control method thereof, which may prevent the occurrence of a short-circuit due to over-vibration during a spin-drying process.

BACKGROUND ART

In general, a washing machine refers to various apparatuses for treating laundry by applying a physical and/or chemical action to the laundry such as clothes, bedding, and the like. The washing machine includes an outer tub that holds wash water and an inner that holds laundry and is rotatably installed in the outer tub. A washing method of a general washing machine includes a washing process of washing the laundry by rotating the inner tub and a spin-drying process of dewatering the laundry using a centrifugal force of the inner tub.

In the washing process and the spin-drying process, the laundry may be off center due to a rotation of the inner tub. The off-centeredness (or eccentricity) of the laundry may cause the center of gravity of the inner tub to be inclined to one side and the inner tub to be over-vibrated to collide with the outer tub. The collision between the inner and outer tubs may cause noise and may also apply physical shocks to the inner and outer tubs.

In particular, the over-vibration problem due to the eccentricity of the inner tub occurs during the spin-drying process in which the inner tub rotates rapidly, and a method of improving the over-vibration during the spin-drying process is required.

DISCLOSURE

Technical Problem

An embodiment of the present invention aims to solve the above-mentioned problem.

Furthermore, an embodiment of the present invention is to improve the problem caused by over-vibration of an inner tub during a spin-drying process.

Furthermore, an embodiment of the present invention is to propose a method of preventing over-vibration of an inner tub in advance.

Technical Solution

Furthermore, in this specification, an intelligent washing machine includes: an inner tub in which laundry is placed; a motor transferring a rotational force to the inner tub; an image obtaining unit obtaining an image of the laundry placed in the inner tub after a washing process; and a controller obtaining a laundry classification information reflecting water content percentage information of the laundry from the image of the laundry, learning the laundry classification information to predict a degree of vibration of the inner tub that occurs in a spin-drying process, and varying a revolutions per minute (RPM) of the motor in the spin-drying process according to the predicted degree of vibration of the inner tub.

According to the present invention, the controller may control the motor to lower the RPM in the spin-drying process if a short-circuit is predicted due to over-vibration in the spin-drying process according to a result of learning the laundry classification information.

The controller may classify the laundry classification information as a short-circuit trigger laundry if a short-circuit occurs due to over-vibration in an nth n is a natural number) spin-drying process, and lower the RPM of the motor in an (n+i)th (i is a natural number) spin-drying process if the laundry classification information obtained by the image obtaining unit before the (n+1)th spin-drying process is matched to the short-circuit trigger laundry.

The controller may obtain short-circuit timing information indicating the occurrence of the short-circuit in the nth spin-drying process, and lower the RPM of the motor in the (n+i)th spin-drying process according to the short-circuit timing information.

The image obtaining unit may obtain laundry dispersion information from an image of the laundry obtained prior to the washing process, and the controller may perform laundry dispersion control according to the laundry dispersion information.

The controller may generate a user notification event for the laundry dispersion control.

The controller may rotate the inner tub for the laundry dispersion control.

Furthermore, in this specification, a method of controlling an intelligent washing machine includes: obtaining an image of laundry placed in an inner tub of the washing machine; obtaining laundry classification information reflecting water content percentage of the laundry from the image of the laundry; predicting a degree of vibration of the inner tub during a spin-drying process from the laundry classification information; and adjusting a revolutions per minute (RPM) of the motor which transmits a rotational force to the inner tub according to the predicted degree of vibration of the inner tub.

The adjusting of the RPM of the motor may include lowering the RPM of the motor during the spin-drying process if a short-circuit is predicted due to over-vibration in the spin-drying process.

The predicting of the degree of vibration of the inner tub may include classifying the laundry classification information as a short-circuit trigger laundry if a short-circuit occurs due to over-vibration in an nth (n is a natural number) spin-drying process.

The controlling of the RPM of the motor may include lowering the RPM of the motor in an (n+i)th (i is a natural number) spin-drying process if the laundry classification information prior to the (n+1)th spin-drying process is matched to the short-circuit trigger laundry.

The predicting of the degree of vibration of the inner tub may include obtaining short-circuit timing information indicating the occurrence of the short-circuit in the nth spin-drying process.

The adjusting the RPM of the motor may include lowering the RPM of the motor in the (n+i)th spin-drying process according to the short-circuit timing information.

The method may further include receiving, from a network, downlink control information (DCI) used for scheduling transmission of the image of the laundry or the laundry classification information, wherein the image of the laundry or the laundry classification information may be transmitted to the network on the basis of the DCI.

The method may further include performing an initial access procedure with the network on the basis of a synchronization signal block (SSB), wherein the image of the laundry or the laundry classification information may be transmitted to the network through a physical uplink shared channel (PUSCH), and the SSB and a demodulation reference signal (DM-RS) of the PUSCH may be quasi-co-located, QCL, for a QCL type D.

Advantageous Effects

According to the present invention, by controlling the RPM of the motor by predicting a degree of vibration in the spin-drying process, it is possible to prevent over-vibration from occurring.

According to the present invention, by learning an event that a short-circuit occurs due to over-vibration and controlling the RPM in the spin-drying process on the basis of the learned event, it is possible to prevent a short-circuit from occurring in a later spin-drying process.

According to the present invention, a time for spin-drying may be shortened by performing high-speed spin-drying according to vibration.

DESCRIPTION OF DRAWINGS

FIG. 1 is a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIGS. 4 and 5 are views illustrating an intelligent washing machine according to an embodiment of the present invention.

FIG. 6 is a block diagram of an artificial intelligence (AI) device according to an embodiment of the present invention.

FIG. 7 is a flowchart illustrating a control method of a washing machine according to the present invention.

FIG. 8 is a flowchart illustrating a method of controlling a washing machine according to another embodiment.

FIG. 9 is a view illustrating a method of controlling a revolutions per minute (RPM) of a motor in a spin-drying process in the case of prediction of low vibration.

FIG. 10 is a view illustrating a method of controlling RPM of a motor at a low speed in a spin-drying process.

FIG. 11 is a view illustrating a method of generating an RPM control signal according to another embodiment of the present invention.

FIG. 12 is a view illustrating a method of event notification according to an embodiment of the present invention.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/ environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System p A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'rssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'.

Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management' from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology may be applied in combination with the methods proposed in the present invention to be described later or may be supplemented to specify or clarify technical features of the methods proposed in the present invention.

Intelligent Washing Machine

FIG. 4 is a view illustrating an intelligent washing machine according to an embodiment of the present invention. FIG. 5 is a block diagram illustrating main components of the washing machine illustrated in FIG. 4.

Referring to FIGS. 4 and 5, a washing machine 10 according to an embodiment of the present invention includes a controller 100, a hardware unit 200, an image obtaining unit 300, and a user interface 400.

The controller 100 controls driving of the washing machine 10 by controlling the hardware 200 according to information input through the user interface 400. Further, the controller 100 controls an operation of the hardware 200 on the basis of a laundry image obtained through the image obtaining unit 300. More specifically, the controller 100 may obtain laundry classification information or laundry dispersion information from the laundry image and control the operation of the hardware 200 on the basis of the laundry classification information or laundry dispersion information. The laundry classification information may refer to information regarding a type, a material, and the like of the laundry, and particularly, water content percentage information of the laundry.

The controller 100 may learn the laundry classification information to predict a degree of vibration of the inner tub 211 that may occur in a spin-drying process and vary revolutions per minute (RPM) of a motor 220 in the spin-drying process according to the degree of vibration of the inner tub 211. For example, when it is determined that the laundry classification information is determined as laundry that may cause a short-circuit, the controller 100 may control the motor 220 to lower the RPM in the spin-drying process.

The hardware 200 may include a washing tub 210, the motor 220, a water supply valve 230, a heater 240, and the like.

The washing tub 210 includes an outer tub 213 accommodating wash water and an inner tub 211 disposed inside the outer tub 213 allowing the laundry to be placed therein, and rotating using a rotational force provided from the motor 220. The water supply valve 230 controls supply of wash water. The heater 240 heats water supplied in the washing tub.

The image obtaining unit 300 obtains an image of the laundry placed in the inner tub 211. The image obtaining unit 300 may use at least one of 2D and 3D cameras and may be disposed on a cover of the washing machine 10.

The user interface 400 may include a power input unit 410, a start input unit 420, a course selecting unit 430, an option selecting unit 440, a display unit 450, and a speaker 460.

The power input unit 410 provides a means for controlling ON/OFF of a main power source of the washing machine. The start input unit 420 provides a means for controlling start of a washing process, a rinsing process or a spin-drying process. The course selecting unit 430 provides a means for selecting a kind of the washing process, the rinsing process, and the spin-drying process. The option selecting unit 440 provides a means for selecting detailed options for performing the washing process, the rinsing process, or the spin-drying process. For example, the option selecting unit 440 may be a means for selecting options such as a water temperature, time, and reservation. The display unit 450 may display an operational state of the washing machine 10 or display course information selected by the user through the course selecting unit 430 or option information selected through the option selecting unit 440. The speaker 460 outputs an operational state of the washing machine 10 or a situation for a specific event as a voice signal. The specific event may be a situation such as laundry dispersion control or RPM control on the basis of the laundry image.

FIG. 6 is a block diagram of an AI device according to an embodiment of the present invention.

Referring to FIG. 6, the AI device 20 may include an electronic device including an AI module capable of performing AI processing or a server including an AI module. In addition, the AI device 20 may be included as at least a portion of the washing machine 10 illustrated in FIGS. 4 and 5 and perform at least a portion of the AI processing together.

The AI processing may include all operations related to the controller 100 of the washing machine 10 illustrated in FIG. 4. For example, the washing machine 10 may AI-process the laundry image or laundry classification information or laundry dispersion information to perform processing/determination and control signal generating operation.

The AI device 20 may be a client device that directly uses the AI processing result or may be a device in a cloud environment that provides the AI processing result to another device. The AI device 20, which is a computing device that can learn a neural network, may be implemented as various electronic devices such as a server, a desktop PC, a notebook PC, and a tablet PC.

The AI device 20 may include an AI processor 21, a memory 25, and/or a communication unit 27.

The AI processor 21 may learn a neural network using a program stored in the memory 25.

In particular, the AI processor 21 may learn a neural network for recognizing related data of the washing machine 10. Here, the neural network for recognizing the related data of the washing machine 10 may be designed to simulate a human brain structure in a computer and include a plurality of network nodes having weights which simulate neurons of the human neural network.

Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Method of Controlling Intelligent Washing Machine

FIG. 7 is a flowchart illustrating a method of controlling a washing machine according to the present invention.

Referring to FIG. 7, in the method of controlling a washing machine according to the present invention, laundry classification information of laundry is obtained in a first step (S710). Before a spin-drying process is performed, the image obtaining unit 300 obtains an image of the laundry placed in the inner tub 211. The controller 100 obtains laundry classification information from an image of the laundry. The laundry classification information refers to a kind, material, or water content percentage information for each laundry. The controller 100 may obtain the kind, material, or water content percentage information of the laundry by comparing the image of the laundry or feature points of the image with a predetermined image or feature points.

The image obtaining unit 300 may obtain a plurality of images in order to obtain laundry classification information for each of a plurality of laundry items. In particular, the controller 100 may rearrange positions of the laundry items placed in the inner tub 211 in order to obtain laundry classification information of the laundry items placed in a bottom surface of the inner tub 211. For example, the controller 100 may rearrange the laundry items placed in the inner tub 211 by rotating the inner tub 211 by driving the motor 220 for a short time.

For example, after the image obtaining unit 300 obtains a first laundry image, the controller 100 may rearrange the positions of the laundry items in the inner tub 211. The controller 100 obtains laundry classification information from the first laundry image.

Subsequently, after the image obtaining unit 300 may obtain a second laundry image, the controller 100 may rearrange the positions of the laundry items in the inner tub 211. In addition, the controller 100 additionally obtains laundry classification information from the second laundry image.

In this manner, laundry classification information of the plurality of laundry items may be obtained by rearranging the positions of the laundry items placed in the inner tub 211 whenever the image obtaining unit 300 obtains the images of the laundry items.

In a second step S720, a degree of vibration in the spin-drying process is predicted on the basis of the laundry classification information.

The controller 100 calculates a water content percentage for each laundry on the basis of the laundry classification information. To this end, the controller 100 estimates, as individual laundry, different objects in the laundry classification information and calculates a degree of water content percentage of each laundry item on the basis of the laundry classification information for each laundry item. The water content percentage of the laundry does not need to be calculated in physical units and may be enough to indicate a relative difference of each laundry item.

The controller 100 calculates a difference in water content percentage of each of the laundry items placed in the inner tub 211 and predicts a degree of vibration in the spin-drying process using the calculated difference in water content percentage.

In a third step (S730), the spin-drying process is performed by adjusting RPM of the motor 220 according to the predicted degree of vibration.

Hereinafter, a specific embodiment of controlling the RPM of the motor 220 in the spin-drying process will be described.

FIG. 8 is a flowchart illustrating a method of controlling a washing machine according to another embodiment of the present invention.

Referring to FIG. 8, in the method of controlling the washing machine according to another embodiment of the present invention, a first image is read in a first step (S801). The first image reading refers to obtaining laundry dispersion information from a laundry image of the inner tub 211 obtained by the image obtaining unit 300. The laundry dispersion information refers to information on an arrangement of laundry items and a height of the laundry items in the inner tub 211. The laundry dispersion information may also be regarded as load information of the laundry items.

In a second step S802, the controller 100 performs UB reading on the basis of the laundry dispersion information. The UB reading is determining whether a short-circuit is predicted due to over-vibration in the washing process or the spin-drying process.

In a third step S803, the controller 100 rearranges the laundry items. The process of rearranging the laundry items is performed when a short-circuit is predicted due to over-vibration in the washing process or the spin-drying process according to the UB reading performed in the second step S802. In order to rearrange the laundry items, the controller 100 may rotate the motor 220 to disperse the laundry items arranged in the inner tub 211.

In addition, the controller 100 may generate a notification event for transmitting a notification to the user to rearrange the laundry items. For example, the controller 100 may display a message for recommending rearrangement of the laundry items through the display unit 450 or may transmit a voice signal for recommending rearrangement of the laundry items through the speaker 460.

In a fourth step S804, the controller 100 performs a washing process. The controller 100 performs the washing process immediately after rearranging the laundry items in the third step S803 or if a short-circuit is not predicted in the second step S802.

After the washing procedure is completed, the controller performs second image reading in a fifth step S805.

The second image reading refers to obtaining laundry classification information from the laundry image of the inner tub 211 obtained by the image obtaining unit 300. The laundry classification information refers to a kind, material, or water content percentage information for each laundry. The controller 100 may obtain the type, material, or water content percentage information of the laundry by comparing the image of the laundry items or the feature points of the image with a predetermined image or predetermined feature points.

As in the embodiment described above with reference to FIG. 7, the image obtaining unit 300 may obtain a plurality of images in order to obtain laundry classification information for each of the plurality of laundry items.

In a sixth step S806, the controller 100 predicts vibration of the spin-drying process on the basis of a result of the second image reading.

In a seventh step S807 and an eighth step S808, when the vibration predicted in the spin-drying process is a low vibration, the controller 100 performs the spin-drying process at high RPM.

In order to predict the degree of vibration in the spin-drying process, the controller 100 may calculate a difference in water content percentage of each of the laundry items on the basis of the laundry classification information of the laundry items. The controller 100 may consider that vibration may be reduced in the spin-drying process as the difference in the water content percentage is smaller. Therefore, the controller 100 determines that the vibration is low if the difference in water content percentage of the laundry items is less than or equal to a predetermined first threshold.

FIG. 9 is a view illustrating a method of controlling the RPM of the motor in the spin-drying process when a low vibration is predicted. A first graph g1 is a graph illustrating RPM of the motor 220 in a normal spin-drying process and a second graph g2 is a graph illustrating RPM of the motor 220 when a low vibration is predicted.

Referring to FIG. 9, after the spin-drying process is started at a first timing t1, the motor 220 performs the spin-drying process, while increasing the RPM in stages. A second timing t2 indicates a timing at which the RPM starts to be finally increased. In a normal state, the motor 220 is driven at a maximum RPM at a fourth timing t4. In the eighth step S808, the controller 100 controls the motor 220 to increase the speed of increasing the RPM to reach the maximum RPM at a third timing t3. As a result, while an end point of the spin-drying process in the normal state is a sixth timing t6, an end point of the spin-drying process in the case of controlling the RPM at the high speed in the eighth step S808 may be the fifth timing t5.

As described above, in an embodiment of the present invention, if the predicted vibration of the spin-drying process is low, the controller 100 may shorten the time of the spin-drying process by performing the high speed spin-drying.

In a ninth step S809, if the predicted vibration of the spin-drying process is not low, the controller 100 determines a possibility of over-vibration.

Since the ninth step S809 is based on the assumption that the vibration is not low, if the vibration of the spin-drying process predicted in the ninth step S809 is not over-vibration, the predicted degree of vibration corresponds to normal. Therefore, when the vibration predicted in the ninth step S809 is not over-vibration, the controller 100 performs a normal spin-drying process in a tenth step S810. The normal spin-drying process may be performed on the basis of RPM control of the motor 220 such as the first graph g1 illustrated in FIG. 9.

If the vibration predicted in the ninth step S809 is over-vibration, the controller 100 controls the RPM at a low speed in an eleventh step S811.

FIG. 10 is a view illustrating a method of controlling the RPM of the motor at a low speed in the spin-drying process. The first graph g1 is a graph illustrating RPM of the motor 220 in the normal spin-drying process, and the second graph g2 is a graph illustrating RPM of the motor 220 controlled at a low speed.

Referring to FIG. 10, when the predicted vibration of the spin-drying process is over-vibration, the controller 100 controls a maximum RPM of the motor 220 to be lower than the maximum RPM in the normal spin-drying process.

The controller 100 may lower the value of the maximum RPM to improve the occurrence of a short-circuit due to over-vibration in the spin-drying process.

The embodiment of FIG. 8 has been described on the basis of the method of using laundry classification information for second image reading. After the washing process, second image reading may use laundry dispersion information like the first image reading, in addition to laundry classification information. For example, the degree of vibration in the spin-drying process is proportion to the amount of laundry. Therefore, in the process of predicting the degree of vibration in the sixth step S806 of FIG. 8, the controller 100 may regard the predicted vibration as being proportional to the amount of laundry.

In addition, the controller 100 may predict a degree of vibration by combining the laundry classification information and the laundry dispersion information. The controller 100 may predict the degree of vibration in the spin-drying process by assigning a predetermined weight to each of the laundry classification information and the laundry dispersion information and adding the degree of vibration based on the laundry classification information and the degree of vibration based on the laundry dispersion information.

FIG. 11 is a view illustrating a method of generating an RPM control signal according to another embodiment of the present invention.

The controller 100 may control the communication unit to transmit state information of the washing machine 10 to the AI processor included in a 5G network. Further, the controller 100 may control the communication unit to receive AI-processed information from the AI processor. The AI-processed information may be information determined as one of laundry that causes a short-circuit or laundry which is free of a risk of a short-circuit.

The controller 100 may transmit image information or feature values of the washing machine 10 to the network on the basis of a DCI. In addition, the controller 100 may transmit short-circuit information to the network. The image information of the washing machine 10 may be transmitted to the network through a physical uplink shared channel (PUSCH), and a synchronization signal block (SSB) and a demodulation reference signal (DM-RS) of the PUSCH may be quasi-co-located, QCL, for a QCL type D.

Referring to FIG. 11, the washing machine 10 may transmit the short-circuit information along with the image information or the feature values to a 5G network (S1400).

Here, the 5G network may include an AI processor or an AI system, and the AI system of the 5G network may perform AI processing on the basis of the received image information.

If a short-circuit occurs in a washing process or a spin-drying process of the washing machine 10 the controller 100 generates short-circuit information and transmits the short-circuit information to the 5G network.

The AI system may input the image information or feature values received from the washing machine 10 to an ANN classifier (S1411). The AI system analyzes an ANN output value (S1413), predicts a degree of vibration in the spin-drying process from the ANN output value, and generates an RPM control signal according to the degree of vibration (S1415). In particular, the AI system may generate the RPM control signal by combining the short-circuit information. That is, the AI system classifies the corresponding image information as a short-circuit trigger laundry when a short-circuit occurs due to over-vibration in an nth (n is a natural number) spin-drying process. In addition, the AI system may generate an RPM control signal to lower the RPM of the motor in the spin-drying process if the image information or the feature values corresponding to the short-circuit trigger laundry is received in the spin-drying process.

In addition, the short-circuit information may include timing information in which the short-circuit occurs. The AI system may generate an RPM control signal to lower the RPM at the time of the occurrence of the short-circuit in the spin-drying process.

The 5G network may transmit the RPM control signal determined by the AI system to the washing machine 10 through the wireless communication unit (S1420).

The embodiment of FIG. 11 illustrates a method of generating the RPM control signal in the AI system by combining the short-circuit information. The method of using the short-circuit information in this embodiment of the present invention may also be applied to the embodiments described above. That is, if a short-circuit occurs in the washing process or the spin-drying process, the controller 100 of the washing machine 10 may store the short-circuit information together with the image of the laundry in a memory (not shown). Also, in a subsequent washing process or spin-drying process, the RPM of the motor 220 may be controlled by comparing the laundry image obtained by the image obtaining unit 300 with an image of the short-circuit trigger laundry.

FIG. 12 is a method illustrating an embodiment of event notification according to an embodiment of the present invention.

Referring to FIG. 12, the controller 100 transmit a voice signal through a speaker 460 if a specific event occurs or in order to indicate an overall operational state of the washing machine 10.

For example, the controller 100 may transmit a voice signal informing the user to rearrange laundry in relation to the third step S803 illustrated in FIG. 8.

In addition, the controller 100 may notify the user of steps S808, S810, and S811 related to RPM control illustrated in FIG. 8.

The components described herein are to be considered as illustrative and not restrictive in all aspects. The scope of the present invention should be determined by reasonable interpretation of the appended claims, and all changes within the equivalent range of the present invention are included in the scope of the present invention.

The invention claimed is:

1. An intelligent washing machine comprising:

an inner tub in which laundry is placed;

a motor configured to transfer a rotational force to the inner tub;

a camera configured to obtain an image of the laundry placed in the inner tub after a washing process; and a controller, the controller being configured to:

obtain a laundry classification information reflecting water content percentage information of the laundry from the image of the laundry;

learn the laundry classification information to predict a degree of vibration of the inner tub that occurs in a spin-drying process; and control a revolutions per minute (RPM) of the motor differently in the spin-drying process according to whether the predicted degree of vibration of the inner tub corresponds to any of low vibration in which a difference in water content percentage of the laundry is less than or equal to a first threshold, normal vibration in which the difference in water content percentage of the laundry is larger than the first threshold and is smaller than a second threshold larger than the first threshold, and over vibration in which the difference in water content percentage of the laundry is larger than or equal to the second threshold, wherein, when a short-circuit is predicted due to over vibration in the spin-drying process according to a result of learning the laundry classification information, the controller is configured to control the motor to lower the RPM in the spin-drying process compared to when the normal vibration is predicted.

2. The intelligent washing machine of claim 1, wherein the controller is configured to classify the laundry classification information as a short-circuit trigger laundry if a short-circuit occurs due to over vibration in an nth (n is a natural number) spin-drying process, and is configured to lower the RPM of the motor in an (n+i)th (i is a natural number) spin-drying process if the laundry classification information obtained by the camera before the (n+1)th spin-drying process is matched to the short-circuit trigger laundry.

3. The intelligent washing machine of claim 2, wherein the controller is configured to obtain short-circuit timing information indicating the occurrence of the short-circuit in the nth spin-drying process, and is configured to lower the RPM of the motor in the (n+i)th spin-drying process according to the short-circuit timing information.

4. The intelligent washing machine of claim 1, wherein the camera is configured to obtain laundry dispersion information from an image of the laundry obtained prior to the washing process, and the controller is configured to perform laundry dispersion control according to the laundry dispersion information.

5. The intelligent washing machine of claim 4, wherein the controller is configured to generate a user notification event for the laundry dispersion control.

6. The intelligent washing machine of claim 4, wherein the controller is configured to rotate the inner tub for the laundry dispersion control.

7. The intelligent washing machine of claim 1, wherein, when the low vibration is predicted, the controller is configured to control the motor to perform a high speed spin-drying that can reduce spin-drying time compared to when the normal vibration is predicted.

8. A method of controlling an intelligent washing machine, the method comprising:

obtaining an image of laundry placed in an inner tub of the washing machine;

obtaining laundry classification information reflecting water content percentage of the laundry from the image of the laundry;

predicting a degree of vibration of the inner tub during a spin-drying process from the laundry classification information; and controlling a revolutions per minute (RPM) of a motor which transmits a rotational force to the inner tub differently according to whether the predicted degree of vibration of the inner tub corresponds to any of low vibration in which a difference in water content percentage of the laundry is less than or equal to a first threshold, normal vibration in which the difference in water content percentage of the laundry is larger than the first threshold and is smaller than a second threshold larger than the first threshold, and over vibration in which the difference in water content percentage of the laundry is larger than or equal to the second threshold, wherein, when a short-circuit is predicted due to over vibration in the spin-drying process according to a result of learning the laundry classification information, controlling the motor to lower the RPM in the spin-drying process compared to when the normal vibration is predicted, wherein the predicting of the degree of vibration of the inner tub comprises classifying the laundry classification information as a short-circuit trigger laundry if a short-circuit occurs due to over vibration in an nth (n is a natural number) spin-drying process, wherein the controlling of the RPM of the motor comprises lowering the RPM of the motor in an (n+i)th (i is a natural number) spin-drying process if the laundry classification information prior to the (n+1)th spin-drying process is matched to the short-circuit trigger laundry, and wherein the predicting of the degree of vibration of the inner tub comprises obtaining short-circuit timing information indicating the occurrence of the short-circuit in the nth spin-drying process.

9. The method of claim 8, wherein the controlling the RPM of the motor comprises lowering the RPM of the motor in the (n+i)th spin-drying process according to the short-circuit timing information.

10. The method of claim 8, further comprising:

receiving, from a network, downlink control information (DCI) used for scheduling transmission of the image of the laundry or the laundry classification information, wherein the image of the laundry or the laundry classification information is transmitted to the network on the basis of the DCI.

11. The method of claim 10, further comprising:

performing an initial access procedure with the network on the basis of a synchronization signal block (SSB), wherein the image of the laundry or the laundry classification information is transmitted to the network through a physical uplink shared channel (PUSCH), and the SSB and a demodulation reference signal (DM-RS) of the PUSCH are quasi-co-located, QCL, for a QCL type D.

12. The method of claim 8, wherein, when the low vibration is predicted, the controlling of the RPM of the motor comprises performing a high speed spin-drying that can reduce spin-drying time compared to when the normal vibration is predicted.

* * * * *